United States Patent [19]

Braschos

[11] 4,320,840

[45] Mar. 23, 1982

[54] DEVICE FOR CULLING ARTICLES SUCH AS PACKAGE UNITS IDENTIFIED AS DEFECTIVE

[76] Inventor: Karl-Heinz Braschos, Goldener Spiegel 13, D-5900 Siegen 1, Fed. Rep. of Germany

[21] Appl. No.: 136,342

[22] Filed: Apr. 1, 1980

[30] Foreign Application Priority Data

Jun. 15, 1979 [DE] Fed. Rep. of Germany ....... 2924312

[51] Int. Cl.³ ................................................ B07C 5/00
[52] U.S. Cl. ..................................... 209/523; 209/652; 198/372; 198/437; 198/440
[58] Field of Search ................ 209/523, 652, 651, 552, 209/688; 198/372, 437, 440

[56] References Cited

U.S. PATENT DOCUMENTS

| | | | |
|---|---|---|---|
| 2,609,926 | 9/1952 | Hartig et al. | 209/524 |
| 2,920,737 | 1/1960 | Engleson et al. | |
| 3,073,444 | 1/1963 | Bielinski et al. | 209/524 |
| 3,471,012 | 10/1969 | Calhoun | |
| 3,771,648 | 11/1973 | Revuelta | 198/372 X |
| 4,253,573 | 3/1981 | Dubberly et al. | 209/651 X |

FOREIGN PATENT DOCUMENTS 1183428 12/1964 Fed. Rep. of Germany .

Primary Examiner—Allen N. Knowles
Attorney, Agent, or Firm—Young & Thompson

[57] ABSTRACT

Articles that pass an inspection station seriatim are removed from their subjacent conveyor or not, depending on the results of inspection, by an ejection device which is a pair of vertically superposed horizontal chains that carry between them upright holders on each of which is mounted a rod for vertical swinging movement from an upright inactive position, to a horizontal outwardly projecting active position. Depending on the results of inspection, one of these rods will be pushed down to the lowered or active position to come into registry with the article to be ejected. The endless chains converge toward the conveyor on which the inspected articles rest, so that the rods progressively push the defective articles from their subjacent belt onto a discharge belt, after which the rods are swung back up to their inactive raised position.

12 Claims, 4 Drawing Figures

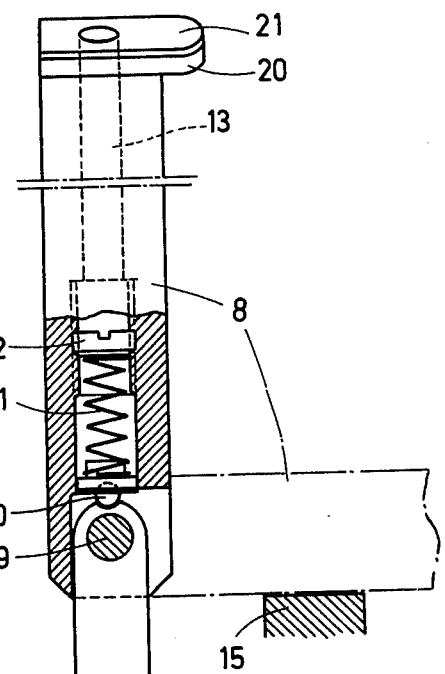
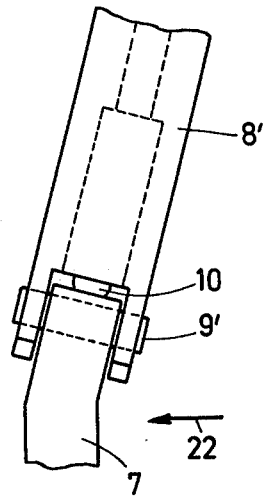
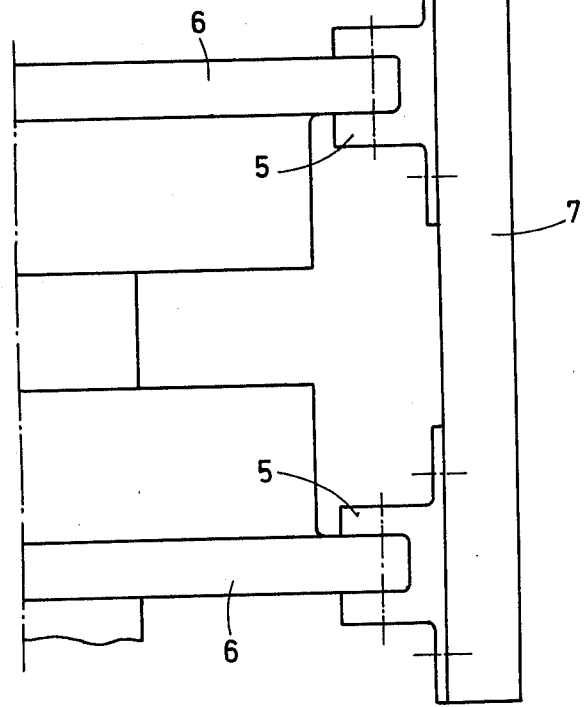
Fig. 4
Fig. 3

DEVICE FOR CULLING ARTICLES SUCH AS PACKAGE UNITS IDENTIFIED AS DEFECTIVE

The present invention relates to apparatus for separating from a series of articles, certain articles such as package units which have been identified as defective. The articles travel on a main conveyor having a horizontal conveying surface, on which they rest by gravity, from a filling or feeding station through an inspection station, and thence past an ejection station in which, dependent on the results of inspection, the articles may or may not be ejected onto a secondary conveyor having a horizontal upper surface, the conveyors and ejection station being of course all operated in synchronism with each other.

A conventional device of this type is shown in U.S. Pat. No. 3,471,012, in which an endless chain runs over sprocket wheels having horizontally disposed axles. Pusher elements, upon being triggered in response to a command from the inspection station, are displaced by a control cam so that they move horizontally transversely across the conveyor on which the articles rest, thus gradually pushing the articles from the main conveyor onto a secondary conveyor. This known device, however, is subject to malfunction in the presence of broken glass and piled-up articles in the conveying path. As a result, malfunction and breakage of the apparatus can result.

It is an object of the present invention to overcome the difficulties of the known devices, by providing simple structure which will not malfunction or jam when broken glass or a pile-up is encountered.

The object of the present invention is achieved in that the pusher elements for ejecting selected articles, are mounted on an endless chain to be pivotable individually from a raised inactive position to a substantially horizontal active position, and are displaced by means of a plunger from that raised position. Moreover, the endless chain extends, along the greatest portion of its length, at an acute angle with respect to the main conveyor.

A spring-loaded ball catch can be provided for retaining the pusher elements in the vertical or inactive position; and for the support of the unlocked or triggered pusher elements, a guide strip is provided which extends, as seen from above, parallel to a portion of the endless chain. The guide strip receives the pusher members as they begin to fall and lowers them gradually toward their horizontal or operating position. After the pusher members have performed their article-discharging function, then a further section of this guide strip again gradually raises them toward the rest or inactive position, in which they automatically lock.

Thrust plates coated with an elastomer such as rubber or foam material are provided on the free ends of the pusher members, these plates extending, in the operating position of the pusher members, vertically and in parallel to the direction of travel of the main conveyor.

To ensure that each pusher contacts in each case the article to be ejected, the thrust plates of mutually adjacent pushers when the pushers are disposed parallel to each other, are arranged in position to overlap each other in the manner of fish scales.

The pivotal axes of the pushers can be horizontal and in any event will extend generally in the direction of travel of the endless chain.

The pivotal axes of the pusher elements can alternatively be arranged to be upwardly inclined at an acute angle in the direction of travel of the endless chain. Then, when a pusher element encounters resistance as in the case of breakage or a pile-up of articles, the pusher element can simply swing up and out of the way.

The apparatus of the present invention is accordingly not subject to malfunction or breakage upon encountering pile-ups and broken glass. Moreover, the structure of the device is simple, not least because ordinary conveyor chains, which are commercially available, can be employed for mounting the pushers, the chain links being provided with flanges or plates to which structural components of any desired type can be attached.

Other objects, features and advantages of the present invention will become apparent from a consideration of the following description, taken in connection with the accompanying drawings, in which.

FIG. 3 is a fragmentary elevational view, seen from a direction opposite the direction of travel, and showing a pusher in its inactive raised full line position and in its lowered active phantom line position; and FIG. 4 is a fragmentary elevational view of the pivotal mounting of a pusher according to a modification of the present invention, seen perpendicular to the direction of travel, the direction of travel being toward the left in FIG. 4.

Figure 1:
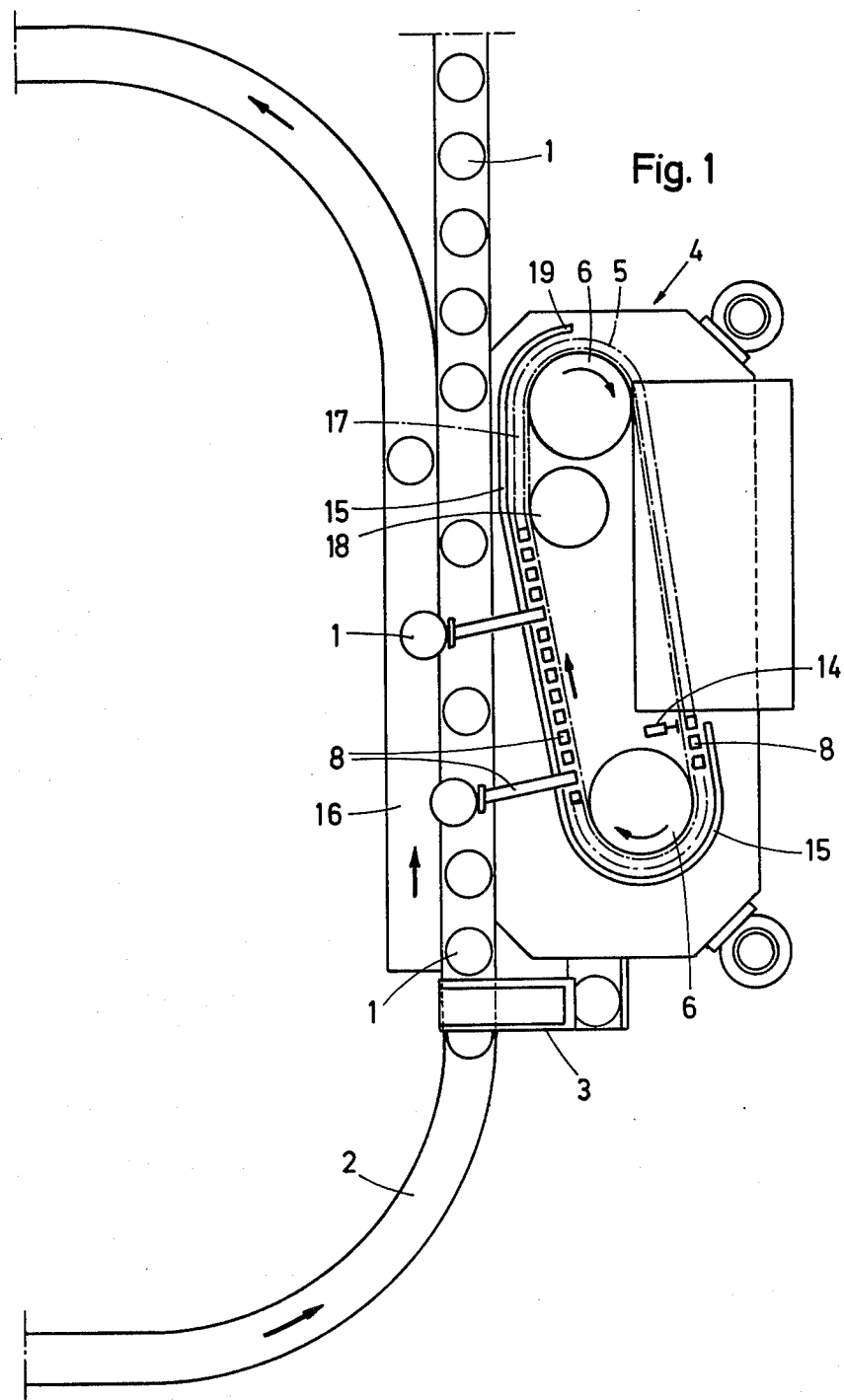
FIG. 1 is a schematic top plan view of apparatus according to the present invention.

Referring now to the drawings in greater detail, and first to FIG. 1 thereof, it will be appreciated that a device according to the present invention is provided, for the culling or separation of selected articles such as empty bottles as well as filled packages. The packages 1, such as bottles or preserve jars, are conveyed on a main conveyor 2 in the direction of the arrow seen in FIG. 1, seriatim at regularly spaced intervals, past an inspection station 3, which latter tests the articles for conformity to any of the conventional criteria. Inspection station 3 is entirely conventional and need not be described in greater detail. Upon identification of a defective or other article to be separated, station 3 actuates a culling or separating device 4. It will of course be understood that conveyor 2 has its upper or article-supporting run disposed in a horizontal plane, so that the articles rest on conveyor 2 by gravity. Conveyor 2 is also entirely conventional, and may for example be of the type comprising a plurality of plates for supporting the articles, the plates being pivotally interconnected so as to permit flexure of conveyor 2 in various directions.

The ejecting device 4 comprises two endless chains 5 (see also FIG. 3), driven by two twin sprocket wheels 6. Chains 5 are superposed and congruent and lie in vertically spaced horizontal planes. Vertical rods 7 interconnect corresponding links of chains 5 (see FIG. 3); and an elongated pusher 8 is pivotally mounted on a pivot pin 9 at the upper end of each rod 7.

The vertical or rest or inactive position of pushers 8 is shown in FIG. 3 in full line, in which position the pusher is retained by a ball catch 10 or the like. A compression spring 11 for the ball catch 10 is adjustable, as indicated schematically in FIG. 3, with respect to its spring force by means of a setscrew 12 accessible by way of a bore 13 in pusher 8.

Returning now to FIG. 1, two of the pushers 8 are shown in the lowered horizontal operating position. A command from inspection station 3 triggers a pressure-medium-operated plunger 14 or a magnet, whereby a selected pusher 8 is tipped from its vertical position into a slightly inclined position such that the ball 10 is sprung from its recess and the tilted pusher 8 is able to swing by gravity toward the horizontal position. However, the tipped pusher is caught by a guide strip 15 beginning at about the region of plunger 14 and extending thence downwardly inclined to the horizontal, thereby gradually to lower the tipped pusher 8.

Notice also that chains 5 extend, in the direction of their operative run, which is the left run as seen in FIG. 1, toward conveyor 2 at an acute angle and move at substantially the same velocity as conveyor 2. Thus, the triggered or lowered pusher 8, now horizontal, will gradually come into contact with the article 1 selected to be ejected, and then, as chains 5 converge with conveyor 2, will gradually push its selected article 1 off conveyor 2 onto a secondary conveyor 16, which, like conveyor 2, is characterized by a uniplanar horizontal upper run for receiving and supporting the rejected articles. Needless to say, conveyors 2 and 16 likewise travel at the same velocity. In this way, only the articles selected for ejection are disturbed from their position on conveyor 2.

FIG. 1 also shows that chains 5 have a relatively short section 17, nearest to conveyor 2, which is parallel to conveyor 2. Guide strip 16 begins its ascent again in the zone of this section 17, at the beginning of which chains 5 run over a supporting wheel 18, so that at the end 19 of strip 15, the triggered pusher elements 8 have returned to their upright and locked position. The straight portion 17 of chains 5 ensures an unencumbered lifting of the pushers 8, since the forward ends of the latter are released from the packaging units by pivoting about the supporting wheel 18.

Figure 2:
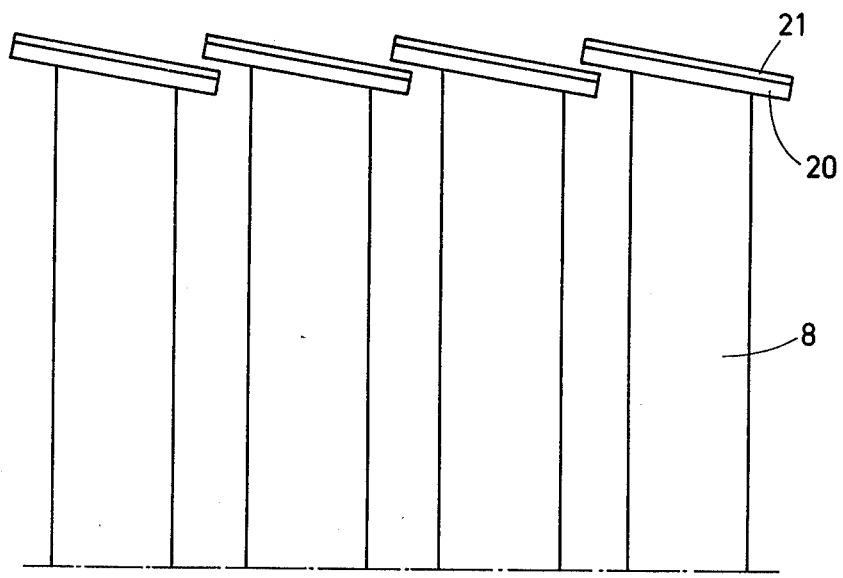
FIG. 2 shows the upper ends of several pushers disposed in the upright or rest position in side-by-side relationship.

At the free ends of the pushers 8, thrust plates 20 are arranged obliquely, as shown in FIGS. 1–3, in such a way that they lie, in the lowered position of the pushers 8, parallel to the conveying direction of conveyor 2. Thrust plates 20 have a soft coating 21 of elastomer such as rubber or foam material or the like (see FIG. 3). As will particularly be seen from FIG. 2, thrust plates 20 are mounted so that they overlap like fish scales, when the pushers are disposed in side-by-side parallel relation.

Thus, the oblique mounting of the thrust plates 20 on pushers 8, performs the unique dual function, not only of ensuring that the thrust plates 20 will contact the articles to be ejected in such a way as to impel those articles only perpendicularly off conveyor 2, but also that the thrust plates 20 can be made of sufficiently large size without interfering with each other in the position shown in FIG. 2.

FIG. 4 shows an alternative embodiment, in which the pivot pins 9' for pushers 8' are arranged in an inclined fashion, namely, inclined upwardly in the direction of travel of the chains 5 shown by arrow 22. This arrangement improves the operating safety of the device, because when resistance is exerted in opposition to the conveying direction of the articles, for example in the case of a pile-up or the presence of an accumulated quantity of broken glass, then that force is exerted against pushers 8' with a substantial upward component about pin 9' as a result of which the pusher 8' automatically swings upwardly to move past the obstruction. The inclination of the pivot pins 9' can also be such that the pushers 8' are disposed in a horizontal plane at right angles to the conveying direction of conveyor 2. In such case, however, the thrust plates 20 have to be mounted perpendicular to the pushers 8', whereby a scale-like overlapping thereof cannot be achieved.

From a consideration of the foregoing disclosure, therefore, it will be evident that the initially recited object of the present invention has been achieved.

Although the present invention has been described and illustrated in connection with preferred embodiments, it is to be understood that modifications and variations may be resorted to without departing from the spirit of the invention, as those skilled in this art will readily understand. Such modifications and variations are considered to be within the purview and scope of the present invention as defined by the appended claims.

What is claimed is:

1. Apparatus for discharging selected articles laterally from a main horizontal conveyor, comprising an endless conveyor on which is mounted a series of pushers for vertical swinging movement between a raised inactive position and a lowered active position, said endless conveyor converging at an acute angle with the main conveyor in the direction of travel of the main conveyor, and means for selectively individually lowering each said pusher into registry with an article to be discharged from the main conveyor as said main and endless conveyors converge.

2. Apparatus as claimed in claim 1, and means for releasably retaining each said pusher in a raised rest position, comprising a spring-loaded ball catch.

3. Apparatus as claimed in claim 1, and guide means that extends along said endless conveyor for receiving and gradually lowering selected said pushers to a horizontal position, and then for raising said lowered pushers to their inactive position after said pushers have discharged their respective articles from the main conveyor.

4. Apparatus as claimed in claim 1, in which said endless conveyor is disposed in a horizontal plane and has one run nearer said main conveyor than its other run, said one run converging for most of its length with said main conveyor but thereafter extending parallel to the main conveyor for a minor portion of its length, and means to raise a lowered said pusher to its upright rest position as said endless conveyor traverses said minor portion of said one run.

5. Apparatus as claimed in claim 1, and thrust plates on the free ends of said pushers, said thrust plates being disposed parallel to said main conveyor in the lowered position of said pushers.

6. Apparatus as claimed in claim 5, and elastic deformable material coating the surfaces of said thrust plates that contact said articles.

7. Apparatus as claimed in claim 5, in which said pushers extend perpendicular to said endless conveyor and said thrust plates are inclined at an acute angle to their respective said pushers.

8. Apparatus as claimed in claim 7, in which, when said pushers are disposed parallel to each other, adjacent said thrust plates overlap each other like scales.

9. Apparatus as claimed in claim 1, said pushers being mounted for vertical swinging movement on horizontal pivot pins that extend in the direction of travel of said endless conveyor.

10. Apparatus as claimed in claim 1, in which said pushers are mounted for vertical swinging movement on pivot pins that extend diagonally upwardly in the direction of travel of said endless conveyor.

11. Apparatus as claimed in claim 1, in which said endless conveyor is disposed in a horizontal plane.

12. Apparatus as claimed in claim 1, in which said pushers are elongated and are upright in said raised inactive position and horizontal in said lowered active position.

* * * * *